United States Patent
Schultz et al.

(10) Patent No.: US 7,269,153 B1
(45) Date of Patent: Sep. 11, 2007

(54) METHOD FOR MINIMIZING TIME CRITICAL TRANSMIT PROCESSING FOR A PERSONAL COMPUTER IMPLEMENTATION OF A WIRELESS LOCAL AREA NETWORK ADAPTER

(75) Inventors: Richard Douglas Schultz, Melbourne, FL (US); George Rodney Nelson, Jr., Merritt Island, FL (US)

(73) Assignee: Conexant Systems, Inc., Newport Beach, CA (US)

( * ) Notice: Subject to any disclaimer, the term of this patent is extended or adjusted under 35 U.S.C. 154(b) by 1069 days.

(21) Appl. No.: 10/442,606

(22) Filed: May 21, 2003

Related U.S. Application Data (60) Provisional application No. 60/383,045, filed on May 24, 2002.

(51) Int. Cl.
  *H04Q 7/24* (2006.01)
(52) U.S. Cl. .................................. 370/338; 370/349
(58) Field of Classification Search ................ 370/389, 370/394, 338, 349, 401, 465, 474
  See application file for complete search history.

(56) References Cited

U.S. PATENT DOCUMENTS 7,117,156 B1 * 10/2006 Kapilow ..................... 704/267
2006/0007848 A1 * 1/2006 Boasson et al. ............ 370/203

* cited by examiner

*Primary Examiner*—Ajit Patel
(74) *Attorney, Agent, or Firm*—Thomas, Kayden, Horstemeyer & Risley, LLP

(57) ABSTRACT

A personal computer's (PC) microprocessor is used to provide both the physical layer (PHY) and media access control (MAC) processing functions required to implement a wireless local area network (WLAN) adapter. This technique uses the microprocessor within the personal computer to pre-compute the time critical PHY waveforms required to respond to received packets. For instance, the acknowledge (ACK) waveform required to respond to a received WLAN packet is pre-computed and stored in the PC memory. Upon receipt of a valid packet, the samples of the ACK waveform are transferred from the PC memory to a digital to analog converter (DAC). The DAC generates the transmit waveform required for the radio modulator. By pre-computing the transmit waveform samples, the required loading on the PC microprocessor is reduced during time critical periods.

17 Claims, 10 Drawing Sheets

Software Driver Processing for
Pre-Computed Control Frames

Prior Art WLAN Adapter
Figure 1.0

Figure 2.0
WLAN Adapter utilizing a PC Host CPU for MODEM and MAC processing

WLAN Generic MAC Frame Format
Figure 3.0

WLAN Request-to-Send (RTS)
Control Frame Format
Figure 4.0

WLAN Clear-to-Send (CTS) Control
Frame Format
Figure 5.0

WLAN Acknowledgement (ACK)
Control Frame Format

Figure 6.0

WLAN PS-Poll Control Frame
Format
Figure 7.0

WLAN CF-End Control Frame
Format
Figure 8.0

WLAN CF-End+CF-Ack Control
Frame Format
Figure 9.0

Software Driver Processing for
Pre-Computed Control Frames

Figure 10.0

METHOD FOR MINIMIZING TIME CRITICAL TRANSMIT PROCESSING FOR A PERSONAL COMPUTER IMPLEMENTATION OF A WIRELESS LOCAL AREA NETWORK ADAPTER

This invention relates to electronic communications systems and more particularly to a system for enabling a computer to transmit and receive information over a packet based wireless communications link. This invention claims the benefit of priority to U.S. Provisional Patent Application No. 60/383,045 filed May 24, 2002.

BACKGROUND OF THE INVENTION

The host microprocessor of personal computers has been used to provide the signal processing functions required to implement wire line analog communications functions for some time. The MODEM functions required to implement exiting wire line standards were historically implemented in software running on dedicated signal processors on the modem hardware. With the advent of more and more powerful personal computers it became possible to implement much of the processing software on the host processor within the PC. Using the host processor instead of dedicated signal processors greatly reduces the cost of the MODEM hardware. If the host processor is powerful enough, the impact on other application running on the host is relatively small when MODEM processing is performed.

The advent of small low cost radios and small portable notebook computers has spurred the recent growth of wireless local area networks (WLAN). These networks are high bandwidth (>1 Mb/s) half duplex packet networks, which contrast with the wire line networks, which are relatively low bandwidth (<56 kb/s), full duplex, and circuit switched. The same cost savings gained in the wire line network adapters by moving the MODEM functions from dedicated hardware to the PC host processor is theoretically possible with WLAN adapters. However, the bit rates and thus the amount of processing required for WLAN adapters is much higher than that of the wire line adapters. On the surface it would appear that the processing required by the WLAN adapter would make the load on the PC host microprocessor prohibitive.

There are several features of the WLAN waveforms and protocol, which can be exploited to allow the host processor in a PC to perform the MODEM functions without significant impact to other applications running on the host processor. First, the WLAN protocol is half duplex, which dictates the host processor is never required to process both transmit and receive waveforms simultaneously. Second, the WLAN protocol is packet based, which means the host processor is not required to process data in a continuous fashion. Third, since the protocol is packet based, every packet is proceeded by a preamble. The preambles can be used to trigger the host processor to perform MODEM processing only when valid packets arrive at the receiver.

Because the WLAN protocol is half duplex much of the time critical processing required in the implementation is the response to valid received packets with a positive acknowledgement (ACK) or other control message. In hardware implementations, the ACK waveform and other control messages are regenerated each time a valid packet is received or the control message is to be sent. The waveform is regenerated even though much of the waveform samples required to generate an ACK is the same each time a packet is received. Similarly, in the case of other control messages much of the frame format is identical for each of the control messages to be sent and thus can be pre-computed and stored in memory.

SUMMARY OF THE INVENTION

A primary objective of the present invention is to provide a technique for enabling a personal computer to transmit and receive information over a packet based wireless communications link at very low cost by using the personal computers central processing unit (CPU) to perform most of the communications link processing.

A secondary objective is to use the personal computers CPU to provide the processing for the packet based wireless communications link in such a way as to minimize the processing load on the CPU so that it can be used simultaneously for both wireless packet data and other desktop applications.

The present invention utilizes the fact that much of the WLAN control frame formats required in the protocol contain data that does not change or changes very slowly. Because these frame formats contain data that does not change very often, the base band waveform required to send the frame formats does not change. This allows the base band waveform samples to be pre-computed, stored in memory and then sent to the transmitter when needed. By storing the waveform ahead of time, the computations required by the host CPU during the time critical period right after a valid packet reception can be reduced. One such control frame of particular interest is an ACK frame. Upon receipt of a valid data frame, the WLAN protocol requires that an ACK frame be sent within 10-20 microseconds (us). Because of the tight timeline for transmitting the ACK after a valid packet receipt, having the ACK pre-computed and stored in memory allows a software based WLAN adapter to provide the ACK in the necessary timeline.

BRIEF DESCRIPTION OF THE DRAWINGS

FIG. 1. is a top level block diagram of a prior art WLAN adapter.

FIG. 2. is a block-schematic diagram a WLAN adapter which relies on the central processor unit (CPU) of a personal computer (PC) to perform MODEM and MAC functions.

FIG. 3. is a diagram of the generic message formats for which the WLAN transmit waveforms can be pre-computed.

FIG. 4. is a diagram of the Request-to-Send (RTS) control frame format.

FIG. 5. is a diagram of the Clear-to-Send (CTS) control frame format.

FIG. 6. is a diagram of the Acknowledge (ACK) control frame format.

FIG. 7. is a diagram of the PS-Poll control frame format.

FIG. 8. is a diagram of the CF-End control frame format.

FIG. 9. is a diagram of the CF-End CF-ACK control frame format.

DETAILED DESCRIPTION

Before explaining the disclosed embodiment of the present invention in detail it is to be understood that the invention is not limited in its application to the details of the particular arrangement shown since the invention is capable of other embodiments. Also, the terminology used herein is for the purpose of description and not of limitation.

Wireless Local Area Networks (WLAN) such as that standardized in IEEE 802.11, were designed to provide un-tethered access to information sources such as the Internet and enterprise file systems. The WLAN allows standard Internet protocol (IP) traffic to be transmitted using RF frequencies eliminating the need for a "hardwired" Ethernet connection common on "wired" local area networks (LAN). Just as in wired networks, the physical interface to the network is implemented on what is known as a "network adapter" or just "adapter". In prior art, the WLAN service was provided to the applications (file managers, Internet browsers, etc.) running on a computers host CPU via four components.

The first component is a software device driver allowing the application on the host CPU to access the WLAN service through a common interface such as a TCP protocol stack. The software driver provides the interface between the TCP protocol stack and the media access control functions (MAC), which are specific to the WLAN.

The MAC function provides the support protocol required to transport the IP traffic or packets over the wireless medium. The MAC provides data rate and error control as well as congestion management. The MAC also provides the interface between the software driver and the physical layer modulation and demodulation (MODEM) functions. In prior art the MAC function was implemented on a dedicated processor located on the WLAN adapter.

The MODEM provides the mapping of the payload data (IP packets) and control data to a form more conducive to wireless transmission and reception. The modulation functions in prior art would include scrambling, interleaving, puncturing, encoding, mapping, and filtering of bits onto the channel. The demodulation functions in prior art would include filtering, de-mapping of bits from the channel, decoding, de-interleaving and de-scrambling. In prior art the MODEM functions were provided via dedicated hardware on the WLAN adapter.

The final function required for implementation of a WLAN adapter is the radio. The radio is used to translate the base-band waveform generated and used by the MODEM up and down to RF frequencies. In prior art the radio functions were provided via dedicated hardware on the WLAN adapter.

FIG. 1.0 outlines the major components of prior art WLAN adapters. The four components are the software driver (104a) running on the host CPU (104), MAC functions (103c), MODEM functions (103b, 103e), and radio (102). The software driver (104a) communicates with the MAC (103c) through an interface (103d). This interface is normally a standardized bus type such as peripheral component interface (PCI), PC Card etc. The MAC receives data from the wireless medium via demodulation functions (103b) and provides data to the wireless medium via the modulator functions (103e). The MODEM functions (103b, 103e), MAC functions 103c, and CPU interface functions (103d) constitute the base-band processing functions (103). The base-band processing utilizes analog to digital converters (ADCs) (103a) to interface with the receive portion of the radio (102). The base-band utilizes digital to analog converters (DACs) (103f) to interface with the transmit portion of the radio (102). The radio consists of two sections, the transmitter (102d, 102e, 102f) and the receiver (102a, 102b, 102c). The radio transmitter receives the analog signal from the base-band processing (103) in a complex format and translates the analog signals to RF using two mixers (102d). The result of the mixing operation is then filtered (102e) and amplified (102f). The transmit/receive (T/R) switch (102g) then connects the amplifiers to the antenna (101). In receive mode the T/R switch (102g) connects the antenna (101) to the receive amplifiers (102a). The result of the amplification is then filtered (102b) and down converted to complex baseband analog via two mixers (102c). The analog outputs of the mixers are presented to ADCs (103a) for processing by the demodulation functions (103b).

FIG. 2.0 outlines a WLAN adapter, which uses the host CPU to perform both MAC and MODEM functions. The details of implementing a WLAN adapter using a host CPU to provide both MAC and MODEM functions is more specifically described in U.S. Provisional Patent Application No. 60/377,028 filed May 2, 2002 and that application is hereby incorporated by reference. The radio functions (202) and antenna (201) are identical to that of prior art (FIG. 1.0). However, the MAC functions of prior art are now implemented in the host CPU software driver (204) and no longer exist in the baseband functions (203). In addition, most of the MODEM functions have been implemented in the host CPU software driver (204). The MODEM functions that remain (203b) on the adapter have been specialized to require host CPU processing only when valid packets arrive at the receiver or when the wireless medium is available for transmission. The host CPU interface (203c) has also been modified to allow the host CPU (204) direct access to various functions previously controlled by the MODEM functions that now reside on the host.

The remaining MODEM functions (203b) on the WLAN adapter are automatic gain control (AGC), preamble detection, timing generation, and waveform identification. The AGC function provides control over the receive amplifiers (202a) to maintain the correct analog signal level into the ADCs (203a). Since this function requires near continuous supervision it must remain an autonomous function of the WLAN adapter. The preamble detection function serves two purposes in prior art WLAN adapters. First, the preamble detector is used to start demodulation processing. Second, the pre-amble detector is used by the transmitter to sense the availability of the wireless access medium. If the preamble detection function does not detect a valid preamble there is no need to perform demodulation processing. Similarly, if valid preambles are being detected there is no need to perform transmit processing since the wireless medium is being used. This fact allows the host CPU to run autonomously from the WLAN adapter unless valid preambles are being detected indicating that there are data packets arriving at the receiver. The waveform identification function works in conjunction with the pre-amble detection to filter out packets that are not of interest to this adapter based on data rate, modulation type etc. Once the preamble detection function detects valid packets, which require demodulation and MAC processing, the host CPU can be interrupted to provide the necessary processing.

The WLAN protocol dictates that the response to several different packet types must occur in 10-20 us. For a software based WLAN adapter this requires that transmit processing must occur within several microseconds of the end of a valid receive packet. The current invention exploits the static or near static nature of the transmit frame formats to reduce transmit processing required to respond to valid frames or packets. What follows is a detailed description of the specific frame formats as specified by the IEEE 802.11 wireless standard and the fields which are in fact static during a packet exchange sequence.

FIG. 3.0 outlines a generic WLAN MAC frame format. The frame consists of a MAC header (301) a frame body (302) and a frame check sequence (FCS) (303). The MAC header (301) contains a frame control segment (301a), a duration field (301b), three address fields (301c,d,e) a sequence control number (301f) and a final address field (301g).

The frame control segment (301a) contains a protocol revision number (301aa), which is fixed and does not change. The type field (301ab) and the subtype field (301ac) in the frame control segment define which type of frame is being transmitted. The present invention pertains to those types transmitted in response to reception of specific packets. In those cases the type field (301ab) is fixed indicating a control frame and the subtype field is one of six values. Those values are shown in Table 1.

TABLE 1

Control Frame Sub Types

| Subtype Field Value | Control Frame Type |
|---|---|
| 1010 | Power Save (PS)-Poll |
| 1011 | Request To Send (RTS) |
| 1100 | Clear To Send (CTS) |
| 1101 | Acknowledgement (ACK) |
| 1110 | Contention-Free (CF)-End |
| 1111 | CF-End + CF-Ack |

The To DS (301ad), From DS (301ae), More Frag (301af), and Retry (301ag) fields are all set to 0 for control frames. The power management field (301ah) can be either 0 or 1 but is fixed for a frame exchange sequence. The More Data field (301ai) is used to indicate to an adapter in power save mode that another packet has been buffered for transmission and it should remain in receive mode and not return to power save mode. For all control frames the More Data field (301ai) is set to 0. The last two fields of the frame control segment (301a) are the WEP field (301aj) and the Order field (301ak) which are both 0 for control frames.

The Duration ID field (301b) of the MAC header (301) represents the duration in microseconds remaining in the current packet exchange. This field is used by the various adapters on the network to determine when the current exchange is over even though they may not be engaged in the exchange or can only hear part of the exchange. Use of this field minimizes the number of collisions on the network. In prior art hardware implementations of the WLAN adapters, this field is updated on each packet transmission by those involved in the packet exchange. Those adapters not involved in the exchange only monitor this field. The four address fields (301c,d,e,g) are used to specify the source address (SA), destination address (DA), transmitting station address (TA), receiving station address (RA) and the basic service set identifier (BSSID). In control frames only RA, TA, and or BSSID are ever specified. The transmitting address is the address of the adapter generating the control frame and thus is known. The RA and BSSID can change and may be different for each control message that must be generated in response to a valid receive packet. In the case of RA and or BSSID the present invention relies on the fact that there are a finite number of RA and the BSSID on the WLAN. Over time the RA's and BSSID can be learned and used to generate a set of control message types for each RA or BSSID.

The frame body (302) is of 0 length for control frame. The frame check sequence (FCS) (303) is a check word computed based on the other data in the frame.

The present invention relies on the fact that the other data in the frame is fixed and thus the FCS can be pre-computed.

FIG. 4.0 depicts the request to send (RTS) control frame format. As can be seen, most of the fields in the frame control segment are 0 (401ad,e,f,g,i,j,k). The power management field (401ah) is either 0 or 1. The protocol field (401aa), type (401ab) and sub type (401ac) are fixed. The intent of the duration field (401b) is to make available to other nodes on the network information concerning the length of the current packet exchange. In prior art, those adapters involved in the exchange update the duration field. Those adapters not involved in the packet exchange monitor the duration field. In the present invention, the desire to pre-compute the control frames require that this field be fixed by the transmitting terminal involved in the packet exchange. Since the primary use of this field is to keep adapters from accessing the wireless medium before the end of the current exchange, the current invention sets this field to a fixed number based on the maximum length exchange for a specific data rate. The TA field (401c) is known. Given that the RA (401d) can be determined, the only variable in the RTS control frame is the state of the power management field (401ah) and the FCS (403). The present invention generates two RTS control frames for each RA on the network. One RTS frame with the power management field (401ah) set to 1 the other with the power management field set to a 0. The present invention learns the RA's on the network over time and generates two RTS frames for each RA. Learning of RA's occurs by keeping track of all the TA's the have been detected by the adapter. Since each TA represents a transmitter address, tracking TA's allows the present invention to determine the transmit addresses of all other adapters on the network. In the time critical transmit processing required to respond to a received packet with a control packet, the RA in the response is the TA of the received packet. Since the adapter of the present invention tracks the TA's, it can pre-compute the response with the correct RA field. If a new TA is detected a new response or set of responses is generated with the RA field set to the TA field. With all the fields determined the FCS can be computed and the samples for the control frame can be generated. This allows the present invention to respond quickly with an RTS control frame by selecting the appropriate stored frame based on the received address (RA) and the current power management mode.

FIG. 5.0 depicts the clear to send (CTS) control frame format. As can be seen most of the fields in the frame control segment are 0 (501ad,e,f,g,i,j,k). The power management field (501ah) is either 0 or 1. The protocol field (501aa), type (501ab) and sub type (501ac) are fixed. The time loaded in the duration field (501b) is again pre-computed in a fashion similar to the duration field in the RTS control frame. Given that the RA (501d) can be determined, the only variable in the CTS control frame is the state of the power management field (501ah) and the FCS (503). The present invention generates two CTS control frames for each RA on the network. One CTS frame with the power management field set to 1 the other with the power management field set to a 0.

The present invention learns the RA's on the network over time using a procedure as outlined for the RTS control frame, and generates two CTS frames for each RA. This allows the present invention to respond quickly with a CTS control frame by selecting the appropriate stored frame based on the received address (RA) and the current power management mode.

FIG. 6.0 depicts the acknowledge (ACK) control frame format. As can be seen most of the fields in the frame control segment are 0 (601ad,e,f,g,i,j,k). The power management field (601ah) is either 0 or 1. The protocol field (601aa), type (601ab) and sub type (601ac) are fixed. The duration field (601b) is set to zero for normal packet exchange, or set to the maximum length exchange for a specific data rate during an exchange with fragmented packets. Given that the RA (601d) can be determined, the only variable in the ACK control frame is the state of the power management field (601ah) and the FCS (603). The present invention generates two ACK control frames for each RA on the network. One ACK frame with the power management field set to 1 the other with the power management field (601ah) set to a 0. Once the power management field is set, the FCS sequence can be calculated. The present invention learns the RA's on the network over time using the procedure outlined for the RTS control frame and generates two ACK frames for each RA. This allows the present invention to respond quickly with an ACK control frame by selecting the appropriate stored frame based on the received address (RA) and the current power management mode.

FIG. 7.0 depicts the PS-Poll control frame format. As can be seen most of the fields in the frame control segment are 0 (701ad,e,f,g,i,j,k). The power management field (701ah) is either 0 or 1. The protocol field (701aa), type (701ab) and sub type (701ac) are fixed. The transmitting terminal knows the TA and thus can be pre-computed. The AID (701b) and BSSID (701d) are the only two variables in the PS-Poll frame. The present invention learns both ID's over time by monitoring network traffic and noting when a new AID and BSSID is seen using the same procedure for learning the RA's on the network. The only other variable in the PS-Poll control frame is the state of the power management field (701ah) and the FCS (703). The present invention generates two PS-Poll control frames for each AID/BSSID pair on the network. One PS-Poll frame with the power management field set to 1 the other with the power management field set to a 0. Once the power management field is set then the FCS can be calculated for the frame.

FIG. 8.0 depicts the CF-End frame format. As can be seen most of the fields in the frame control segment are 0 (801ad,e,f,g,i,j,k). The power management field (801ah) is either 0 or 1. The protocol field (801aa), type (801ab) and sub type (801ac) are fixed. The Duration field (801b) is 0 for the CF-End frame format. The present invention monitors the network traffic for different values of RA (801d) and BSSID (801e). Over time, the present invention builds a table for each RA and BSSID on the network using the procedure outlined for the RTS control frame. Given the RA and BSSID, the present invention computes two CF-End control frames for each RA and BSSID, one with the power management bit set to 0 and one with power management bit set to 1. Once the power management bit is set the FCS (803) can be calculated for the frame.

FIG. 9.0 depicts the CF-End+CF-ACK frame format. As can be seen most of the fields in the frame control segment are 0 (901ad,e,f,g,i,j,k). The power management field (901ah) is either 0 or 1. The protocol field (901aa), type (901ab) and sub type (901ac) are fixed. The Duration field (901b) is 0 for the CF-End+CF-ACK frame format.

The present invention monitors the network traffic for different values of RA (901d) and BSSID (901e). Over time, the present invention builds a table for each RA and BSSID on the network using the procedure outlined for the RTS control frame. Given the RA and BSSID, the present invention computes two CF-End+CF-ACK control frames for each RA and BSSID, one with the power management bit set to 0 and one with power management bit set to 1. Once the power management bit is set, the FCS (903) can be calculated for the frame.

Figure 10:
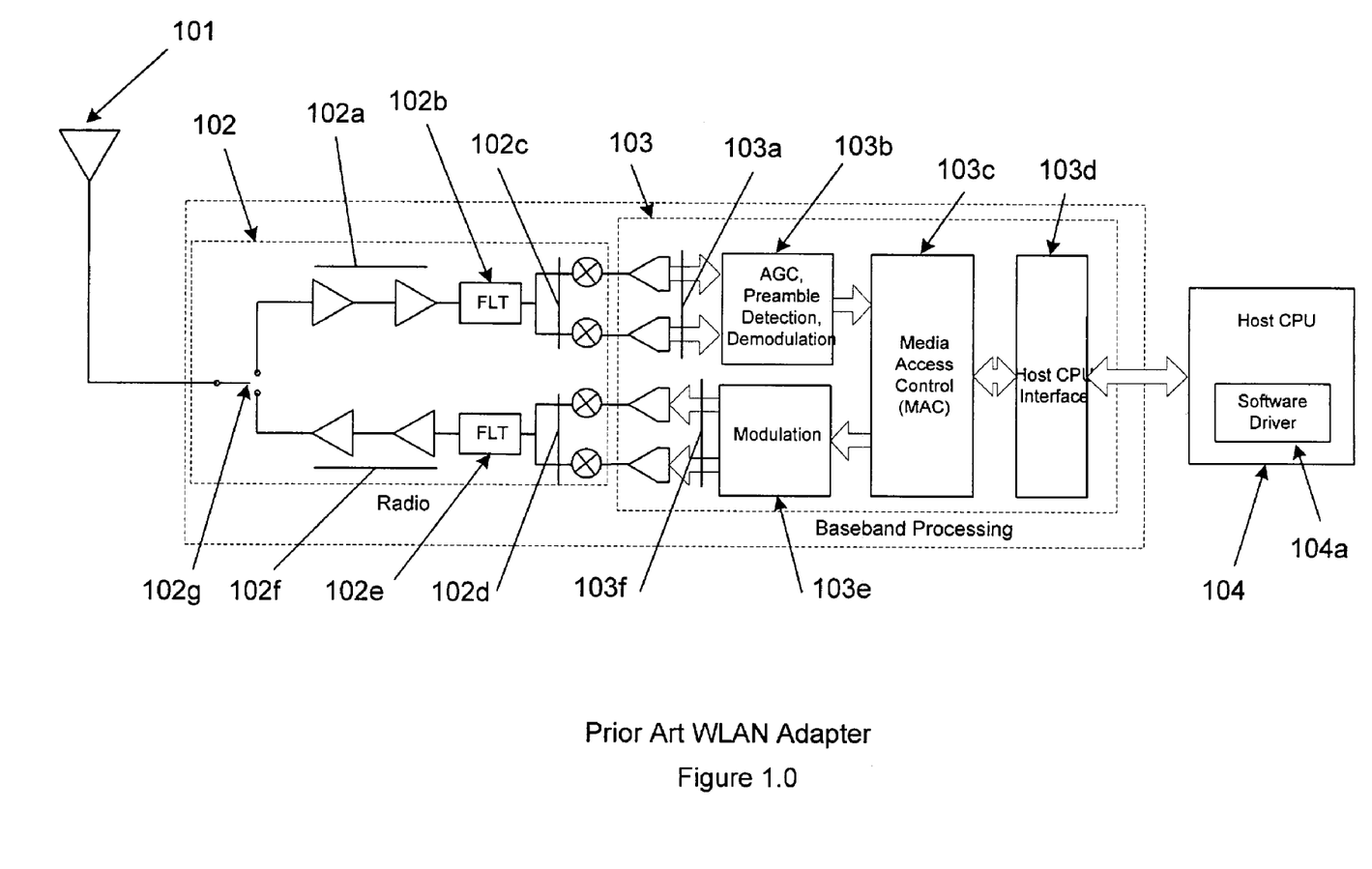
FIG. 10. is a block-schematic diagram of the data flow within the software driver to manage the pre-computed waveforms.

FIG. 10.0 depicts a block schematic diagram of the functions within the software driver required to pre-compute the transmit waveforms for the control frames outlined in FIGS. 4.0 though 9.0. The receive frame demodulator (1001) demodulates the incoming packet and strips out the transmitter address, TA (1001a). The transmitter address is used to index a table of known addresses (1002) to determine if this TA is known or not. If the TA is new (not known) then the software driver generates a set of control frames for the TA (1003). Since the TA becomes the RA in the transmitted control frame, the software driver uses the TA for the RA field for the control frames. The waveform generator (1003) generates a waveform for each control frame, for each data rate, with the power management bit set to a 1 and set to a 0 and the calculated FCS. These waveforms are stored in memory (1004). The memory organization is shown in (1005). The generator (1003) generates two types of control frames; one with the power management bit set to 0, and one with the power management bit set to a 1. This is done for each RA (RA1-RA(N)). The set of control frames for each RA is then generated for each data rate (Rate 1-Rate(N)). The memory for each data rate is depicted in 1005, by 1005a for the first data rate, 1005b for the second data rate, and 1005c for the $N^{th}$ or last data rate. The samples will vary by data rate if the coding and or modulation format for a particular data rate is different from those of other data rates. For each data rate a set of precomputed samples resides in 1005, one for each receive address (RA). In 1005 the set for each RA is shown by 1005aa, 1005ab, and 1005ac. For each rate and RA there exists the samples for two transmit packets for each of the six control frame types (1005aaa-1005aal). One packet has the power management bit set to one (1005b,d,f,h,j,l) the other has the power management bit set to a zero (1005a,c,e,g,l,k). It should be understood by those skilled in the art that the memory organization outlined in 1005 is just one embodiment. Other memory organizations exist; such as organization by RA and then by rate, or packet type and then RA or rate, etc. If the received TA is known then the waveform for the control frame exists in memory (1005), having been previously computed. The TA is then used to index the memory (1005) and transfer the waveform samples to the modulator (1006). It is in this way that the present invention minimizes the time critical processing required to respond to a valid receive packet. Over time all TA's on the network are known and the table (1005) is completed. Once this is accomplished there is no transmit processing required to send a control frame, other than transferring the waveform samples to the modulator.

It should be understood by those skilled in the art that the techniques outlined in the above embodiment are not limited to IEEE 802.11 WLAN adapters. Similar techniques can be applied to other wireless packet data standards as well. Blue tooth, IEEE 802.15, as well as newer cellular WAN packet data standards all could be implemented using similar techniques and the host CPU of a personal computer.

While the invention has been described, disclosed, illustrated and shown in various terms of certain embodiments or modifications which it has presumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

The invention claimed is:

1. A method for the reduction of transmit processing in response to a received packet in a communications system comprising:
   generating a plurality of transmit control frames for responding to received packets;
   generating transmit waveform samples from the generated plurality of transmit control frames;
   storing the transmit waveform samples in buffer memory;
   receiving a packet;
   determining a transmit waveform sample associated with the received packet; and
   transmitting the determined transmit waveform samples.

2. A method as in claim 1, wherein the generated transmit control frame contains data which is learned over time from the communications system.

3. A method as in claim 1, wherein the generated transmit control frame contains a duration field.

4. A method as in claim 3, wherein the duration field is set to a maximum length packet exchange for a specific data rate.

5. A method as in claim 1, wherein the generated transmit control frames contain power management mode information.

6. A method as in claim 1, wherein the generation of the transmit waveform samples varies by data rate.

7. A method as in claim 2, wherein the learned data are transmit addresses of received packets.

8. A method as in claim 1, in which the communications system is wireless.

9. A method as in claim 1, in which the communications system is IEEE 802.11.

10. A method as in claim 1, in which the communications system is Bluetooth.

11. A method as in claim 1, in which the communications system is IEEE 802.15.

12. A method for the reduction of transmit processing in response to a received packet in a communications system comprising the steps of:
    maintaining in memory a plurality of transmit waveform samples;
    generating new transmit waveform samples in response to detection of new transmit addresses in the system;
    saving the new transmit samples to the memory;
    indexing the memory based on receiving a specific transmit address in a received packet;
    determining an appropriate transmit waveform sample from the indexed memory; and
    transmitting the appropriate transmit waveform sample.

13. A method as in claim 12, wherein the transmit waveform samples vary by data rate.

14. A method as in claim 12, wherein the indexing of memory varies by data rate.

15. A method as in claim 12, in which the communications system is wireless.

16. A method as in claim 12, in which the communications system is IEEE 802.11.

17. A method as in claim 12, in which the communications system is IEEE 802.15.

* * * * *

UNITED STATES PATENT AND TRADEMARK OFFICE
CERTIFICATE OF CORRECTION

PATENT NO. : 7,269,153 B1  Page 1 of 1
APPLICATION NO. : 10/442606
DATED : September 11, 2007
INVENTOR(S) : Schultz et al.

It is certified that error appears in the above-identified patent and that said Letters Patent is hereby corrected as shown below:

Column 9, line 23, delete "samples" and replace with --sample--.

Column 9, line 24, delete "generated" add replace with --generating--.

Column 9, line 25, delete "frame" and replace with --frames--.

Column 9, line 25, delete "contains" and replace with --contain--.

Column 9, line 25, delete "is" and replace with --are--.

Column 9, line 27, delete "generated" add replace with --generating--.

Column 9, line 28, delete "frame" and replace with --frames--.

Column 9, line 28, delete "contains" and replace with --contain--.

Column 10, line 18, before "tansmit" add --waveform--.

Signed and Sealed this

Twentieth Day of May, 2008

JON W. DUDAS
*Director of the United States Patent and Trademark Office*